United States Patent
Suzuki et al.

(10) Patent No.: US 12,221,999 B2
(45) Date of Patent: Feb. 11, 2025

(54) TURBO FLUID MACHINE

(71) Applicant: KABUSHIKI KAISHA TOYOTA JIDOSHOKKI, Kariya (JP)

(72) Inventors: Fumihiro Suzuki, Aichi-ken (JP); Fumiya Shinoda, Aichi-ken (JP); Hidetaka Hayashi, Aichi-ken (JP); Naoharu Ueda, Aichi-ken (JP); Takuhito Tsutsui, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 102 days.

(21) Appl. No.: 17/992,464

(22) Filed: Nov. 22, 2022

(65) Prior Publication Data
US 2023/0167849 A1    Jun. 1, 2023

(30) Foreign Application Priority Data
Nov. 26, 2021    (JP) .................. 2021-192052

(51) Int. Cl.
*F16C 17/02* (2006.01)
*C10M 125/04* (2006.01)

(52) U.S. Cl.
CPC ......... *F16C 17/024* (2013.01); *C10M 125/04* (2013.01); *C10M 2217/0443* (2013.01); *F16C 2223/30* (2013.01); *F16C 2360/00* (2013.01)

(58) Field of Classification Search
CPC .. F16C 17/024; F16C 17/042; F16C 2208/42; F16C 2202/54; F16C 2360/00; F16C 2360/23; F16C 2360/24; F16C 2360/46; F16C 33/124; F16C 2223/30; C10M 125/04; C10M 2217/0443
See application file for complete search history.

(56) References Cited

U.S. PATENT DOCUMENTS

2019/0085768 A1*  3/2019  Ikeya .................. F01D 25/22
2020/0355174 A1*  11/2020  Tago ................... F04B 27/1054

FOREIGN PATENT DOCUMENTS

| JP | 2017-75678 A | 4/2017 |
| JP | 2019-082195 A | 5/2019 |
| JP | 2019-108968 A | 7/2019 |
| WO | WO-2019124393 A1 * | 6/2019 ............. F01D 25/16 |

OTHER PUBLICATIONS

Machine Translation of WO-2019124393-A1 (Year: 2019).*
Office Action issued Sep. 10, 2024 in Japanese Application No. 2021-192052.

* cited by examiner

*Primary Examiner* — Alan B Waits
(74) *Attorney, Agent, or Firm* — Sughrue Mion, PLLC

(57) ABSTRACT

A turbo fluid machine includes a rotating member having a bearing-contact surface; an operating part configured to rotate together with the rotating member to compress and discharge a fluid; a housing accommodating the rotating member and the operating part; and a foil bearing having a bearing surface that faces the bearing-contact surface and supporting the rotating member such that the rotating member is rotatable relative to the housing. At least one of the bearing-contact surface or the bearing surface has thereon a coating layer. The coating layer comprises polyamide-imide serving as a binder resin and molybdenum disulfide serving as a solid lubricant. A mass ratio of molybdenum disulfide to polyamide-imide is 0.42 or more.

4 Claims, 6 Drawing Sheets

TURBO FLUID MACHINE

CROSS-REFERENCE TO RELATED APPLICATION

This application claims priority to Japanese Patent Application No. 2021-192052 filed on Nov. 26, 2021, the entire disclosure of which is incorporated herein by reference.

The present disclosure relates to a turbo fluid machine.

BACKGROUND ART

Japanese Patent Application Publication No. 2019-082195 discloses a known turbo fluid machine. This turbo fluid machine includes a rotating member, an operating part configured to rotate together with the rotating member to compress and discharge a fluid, a housing for accommodating the rotating member and the operating part, and a foil bearing supporting the rotating member such that the rotating member is rotatable relative to the housing.

The rotating member has a bearing-contact surface, and the foil bearing has a bearing surface that faces the bearing-contact surface. The foil bearing supports the rotating member while contacting the rotating member (i.e., contact support of the rotating member by the bearing) at low speed rotation of the rotating member, and supports the rotating member without contacting the rotating member (i.e., non-contact support of the rotating member by the bearing) at high speed rotation of the rotating member. That is, at low speed rotation of the rotating member, the rotating member is supported by the foil bearing with the bearing-contact surface contacting the bearing surface. At high speed rotation of the rotating member, the rotating member is supported by a fluid film produced in a gap between the bearing-contact surface and the bearing surface without the bearing-contact surface contacting the bearing surface.

When the rotating member rotates at a low speed while contacting the foil bearing, the bearing-contact surface slides on the bearing surface. This is likely to cause a damage, for example, by seizure, to a sliding surface of the bearing-contact surface and/or the bearing surface. In order to reduce such a damage to the sliding surface, the bearing surface and/or the bearing-contact surface have/has a coating layer thereon.

It is important for the foil bearing of such a turbo fluid machine to increase the durability of the coating layer on its surface in order to increase the life of the foil bearing.

The inventors tried to improve wear resistance of the coating layer on the surface by using polyamide-imide, which has high hardness, as a material of the coating layer, in order to increase the durability of the coating layer. However, it was found by a test that highly wear-resistant polyamide-imide coating fails to increase the durability of the coating layer on the bearing surface of the foil bearing as expected.

The present disclosure, which has been made in light of the above-mentioned problem, is directed to providing a turbo fluid machine that is capable of increasing the durability of a coating layer on a bearing surface of a foil bearing and/or a bearing-contact surface so as to increase the life of the foil bearing.

SUMMARY

In accordance with an aspect of the present disclosure, there is provided a turbo fluid machine that includes: a rotating member having a bearing-contact surface; an operating part configured to rotate together with the rotating member to compress and discharge a fluid; a housing accommodating the rotating member and the operating part; and a foil bearing having a bearing surface that faces the bearing-contact surface and supporting the rotating member such that the rotating member is rotatable relative to the housing. At least one of the bearing-contact surface or the bearing surface has thereon a coating layer. The coating layer comprises polyamide-imide serving as a binder resin and molybdenum disulfide serving as a solid lubricant. A mass ratio of molybdenum disulfide to polyamide-imide is 0.42 or more.

Other aspects and advantages of the disclosure will become apparent from the following description, taken in conjunction with the accompanying drawings, illustrating by way of example the principles of the disclosure.

BRIEF DESCRIPTION OF DRAWINGS

The disclosure, together with objects and advantages thereof, may best be understood by reference to the following description of the presently preferred embodiments together with the accompanying drawings in which.

DESCRIPTION OF EMBODIMENTS

The following will describe an embodiment of the present disclosure in detail with reference to the accompanying drawings.

Embodiment

According to an embodiment, a turbo compressor 10 serves as the turbo fluid machine of the present disclosure. The turbo compressor 10 is mounted on a fuel cell vehicle that includes a fuel cell system 1. The fuel cell system 1 supplies oxygen and hydrogen to a fuel cell mounted on the vehicle to generate electricity. The turbo compressor 10 compresses air containing oxygen to be supplied to the fuel cell.

Figure 1:
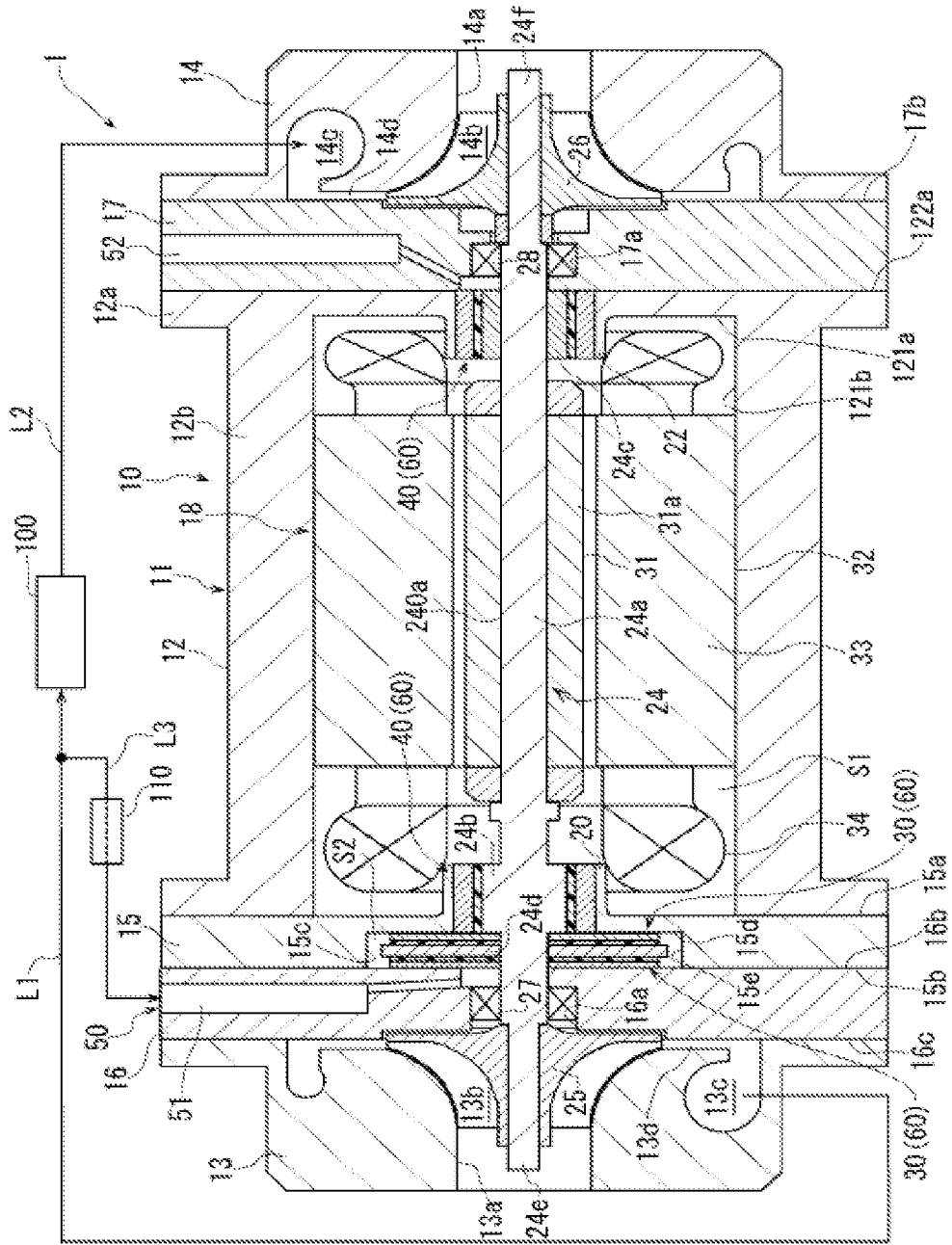
FIG. 1 is a sectional view of a turbo compressor according to an embodiment.

As illustrated in FIG. 1, the turbo compressor 10, which serves as the turbo fluid machine of the present disclosure, includes a housing 11. The housing 11 is made of metal, such as aluminum alloy. The housing 11 includes a motor housing 12, a compressor housing 13, a turbine housing 14, a first plate 15, a second plate 16, and a third plate 17.

The motor housing 12 includes a plate-like end wall 12a and a peripheral wall 12b. The peripheral wall 12b has a cylindrical shape and protrudes from an outer peripheral portion of the end wall 12a. The first plate 15 is connected to an open end of the peripheral wall 12b of the motor housing 12 to close an opening of the peripheral wall 12b.

In the motor housing 12, an inner surface 121a of the end wall 12a, an inner peripheral surface 121b of the peripheral wall 12b, and an end face 15a of the first plate 15 adjacent to the motor housing 12 cooperate to define a motor chamber S1. The motor chamber S1 accommodates an electric motor 18.

The first plate 15 has a first bearing holding portion 20. The first bearing holding portion 20 projects from the center portion of the end face 15a of the first plate 15 toward the electric motor 18. The first bearing holding portion 20 has a cylindrical shape.

The other end face 15b of the first plate 15 is distant from the motor housing 12, and has a recess 15c having a bottom surface 15d. The recess 15c has a circular hole shape. The cylindrical first bearing holding portion 20 is opened toward the bottom surface 15d of the recess 15c through the first plate 15. The recess 15c is formed coaxially with the first bearing holding portion 20. The recess 15c has an inner peripheral surface 15e through which the end face 15b is connected to the bottom surface 15d.

The motor housing 12 has a second bearing holding portion 22. The second bearing holding portion 22 projects from the center portion of the inner surface 121a of the end wall 12a of the motor housing 12 toward the electric motor 18. The second bearing holding portion 22 has a cylindrical shape. The second bearing holding portion 22 is opened on an outer surface 122a of the end wall 12a through the end wall 12a of the motor housing 12. The first bearing holding portion 20 is formed coaxially with the second bearing holding portion 22.

Figure 2:
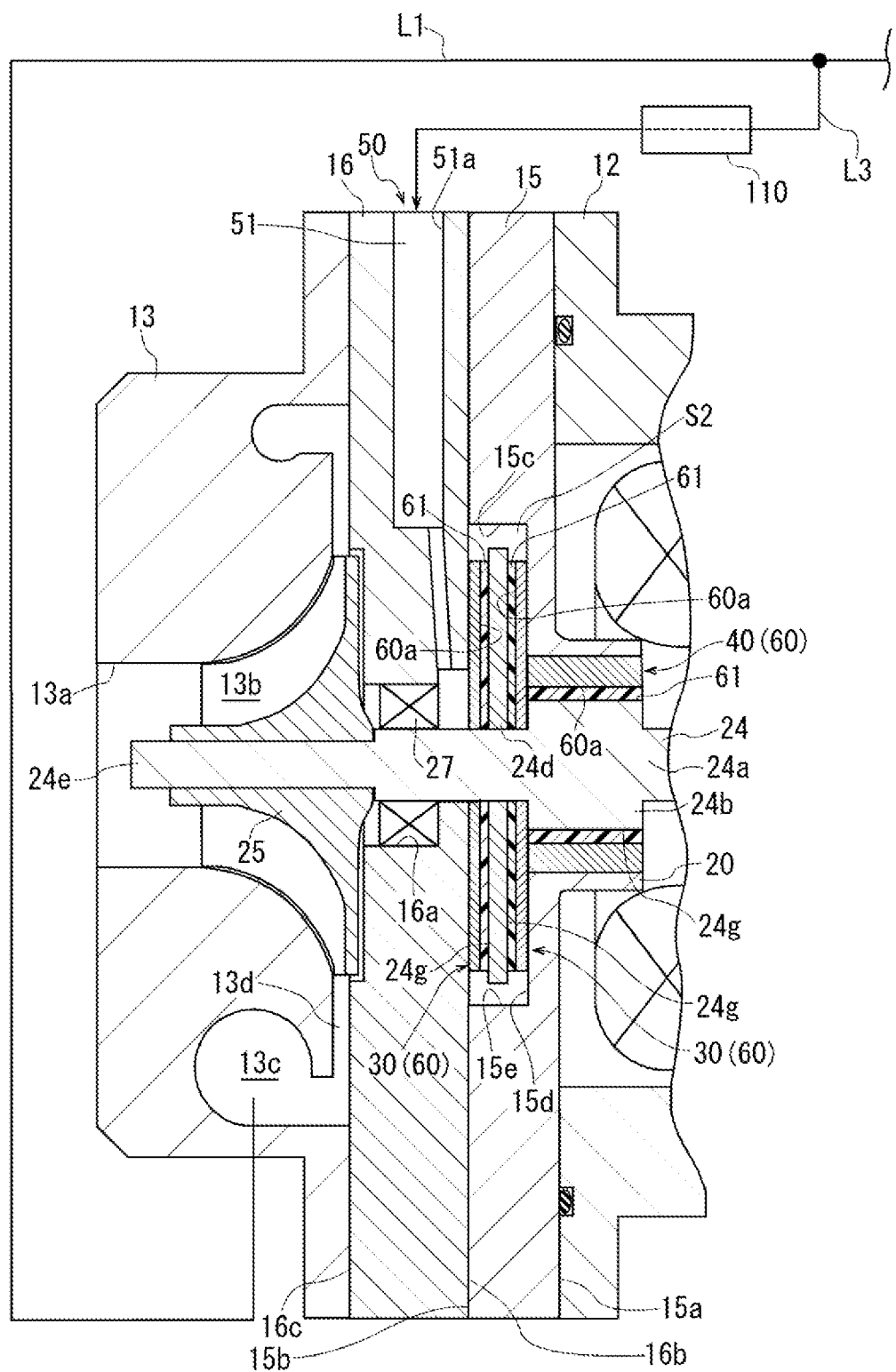
FIG. 2 is a fragmentary enlarged sectional view of the turbo compressor according to the embodiment.

As illustrated in FIG. 2, the second plate 16 is connected to the end face 15b of the first plate 15. The second plate 16 has a shaft insertion hole 16a at the center portion of the second plate 16. The shaft insertion hole 16a is communicated with the recess 15c. The shaft insertion hole 16a is formed coaxially with the recess 15c and the first bearing holding portion 20. The second plate 16 has an end face 16b that is located adjacent to the first plate 15, and the end face 16b cooperates with the recess 15c of the first plate 15 to define a thrust bearing accommodation chamber S2.

The compressor housing 13 has a cylindrical shape, and has a circular hole-shaped inlet 13a through which air is drawn into the compressor housing 13. The compressor housing 13 is connected to the other end face 16c of the second plate 16 that is distant from the first plate 15. The inlet 13a of the compressor housing 13 is formed coaxially with the shaft insertion hole 16a of the second plate 16 and the first bearing holding portion 20. The inlet 13a is opened on an end face of the compressor housing 13 that is distant from the second plate 16.

A first bladed wheel chamber 13b, a discharge chamber 13c, and a first diffuser passage 13d are formed between the compressor housing 13 and the end face 16c of the second plate 16. The first bladed wheel chamber 13b is communicated with the inlet 13a. The discharge chamber 13c extends about the axis of the inlet 13a around the first bladed wheel chamber 13b. The first bladed wheel chamber 13b is communicated with the discharge chamber 13c through the first diffuser passage 13d. The first bladed wheel chamber 13b is communicated with the shaft insertion hole 16a of the second plate 16.

Figure 3:
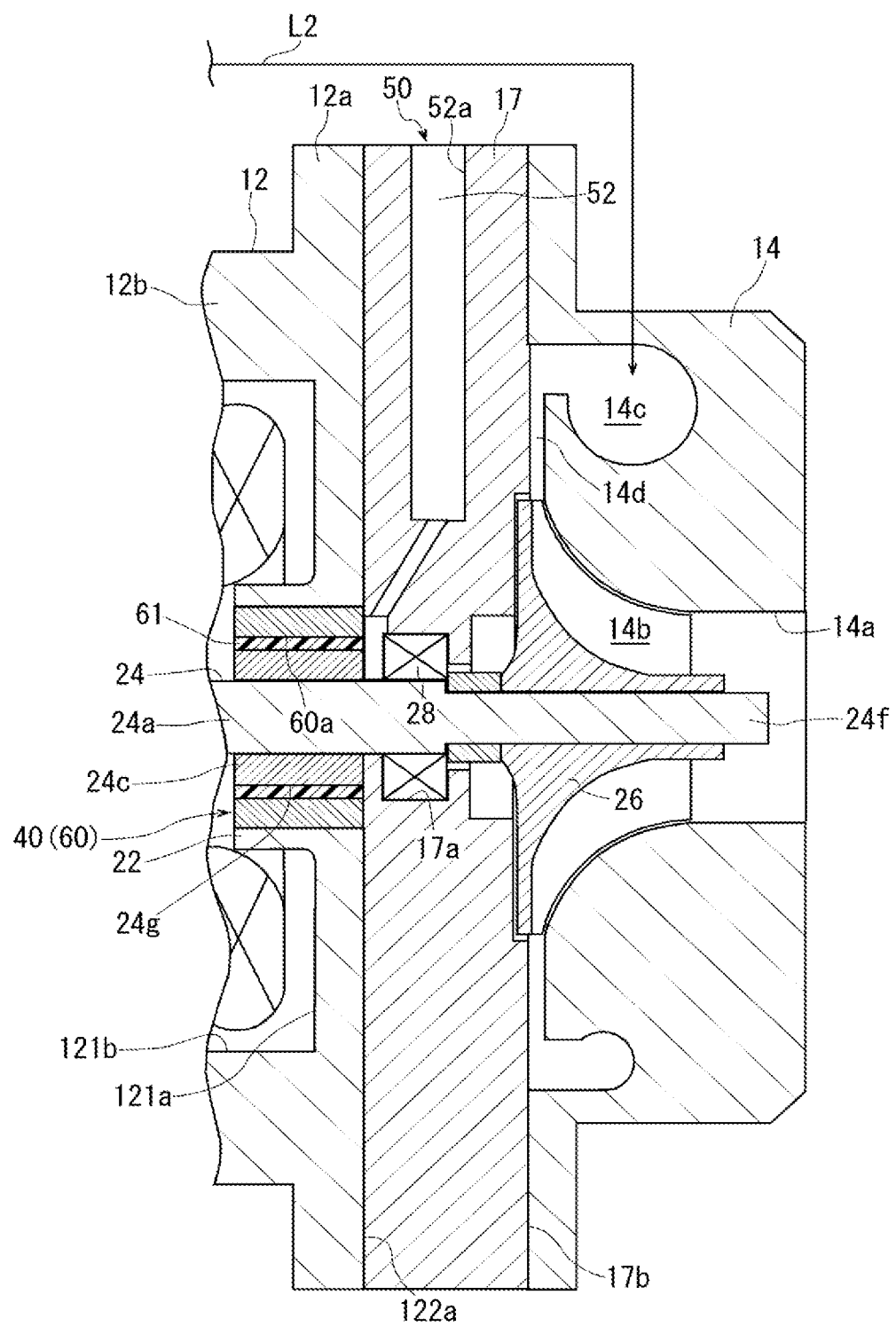
FIG. 3 is another fragmentary enlarged sectional view of the turbo compressor according to the embodiment.

As illustrated in FIG. 3, the third plate 17 is connected to the outer surface 122a of the end wall 12a of the motor housing 12. The third plate 17 has a shaft insertion hole 17a at the center portion of the third plate 17. The shaft insertion hole 17a is communicated with the cylindrical second bearing holding portion 22. The shaft insertion hole 17a is formed coaxially with the second bearing holding portion 22.

The turbine housing 14 has a cylindrical shape, and has a circular hole-shaped outlet 14a through which air is discharged. The turbine housing 14 is connected to the other end face 17b of the third plate 17 that is distant from the motor housing 12. The outlet 14a of the turbine housing 14 is formed coaxially with the shaft insertion hole 17a of the third plate 17 and the second bearing holding portion 22. The outlet 14a is opened on an end face of the turbine housing 14 that is distant from the third plate 17.

A second bladed wheel chamber 14b, a suction chamber 14c, and a second diffuser passage 14d are formed between the turbine housing 14 and an end face 17b of the third plate 17. The second bladed wheel chamber 14b is communicated with the outlet 14a. The suction chamber 14c extends about the axis of the outlet 14a around the second bladed wheel chamber 14b. The second bladed wheel chamber 14b is communicated with the suction chamber 14c through the second diffuser passage 14d. The second bladed wheel chamber 14b is communicated with the shaft insertion hole 17a of the third plate 17.

As illustrated in FIG. 1, a rotating member 24 is accommodated in the housing 11. The rotating member 24 has a rotary shaft 24a as a shaft portion, a first supporting portion 24b, a second supporting portion 24c, and a third supporting portion 24d as a thrust collar. The rotary shaft 24a has a first end portion 24e as an end adjacent to the compressor housing 13 and a second end portion 24f as an end adjacent to the turbine housing 14. The first supporting portion 24b is formed in a part of an outer peripheral surface 240a of the rotary shaft 24a adjacent to the first end portion 24e, and disposed in the cylindrical first bearing holding portion 20. The first supporting portion 24b is formed integrally with the rotary shaft 24a and projected from the outer peripheral surface 240a of the rotary shaft 24a so as to have a ring shape.

The rotary shaft 24a, the first supporting portion 24b, the second supporting portion 24c, and the third supporting portion 24d of the rotating member 24 are each made of titanium alloy.

The second supporting portion 24c is formed in a part of the outer peripheral surface 240a of the rotary shaft 24a adjacent to the second end portion 24f, and disposed in the cylindrical second bearing holding portion 22. The second supporting portion 24c has a cylindrical shape such that the second supporting portion 24c is projected from the outer peripheral surface 240a of the rotary shaft 24a so as to have a ring shape, and is fixed to the outer peripheral surface 240a of the rotary shaft 24a. The second supporting portion 24c is rotatable together with the rotary shaft 24a.

The third supporting portion 24d is disposed in the thrust bearing accommodation chamber S2. The third supporting portion 24d has a disc shape such that the third supporting portion 24d extends from the outer peripheral surface 240a of the rotary shaft 24a so as to have a ring shape, and is fixed to the outer peripheral surface 240a of the rotary shaft 24a. The third supporting portion 24d is rotatable together with the rotary shaft 24a. The third supporting portion 24d is disposed distant from the electric motor 18 in the axial direction of the rotating member 24. In the following description, the axial direction denotes the axial direction of the rotating member 24.

A first bladed wheel 25 that serves as the operating part of the present disclosure is connected to the first end portion 24e of the rotary shaft 24a. The first bladed wheel 25 is disposed closer to the first end portion 24e than to the third supporting portion 24d of the rotary shaft 24a. The first bladed wheel 25 is accommodated in the first bladed wheel chamber 13b. A second bladed wheel 26 is connected to the second end portion 24f of the rotary shaft 24a. The second bladed wheel 26 is disposed closer to the second end portion 24f than to the second supporting portion 24c of the rotary shaft 24a. The second bladed wheel 26 is accommodated in the second bladed wheel chamber 14b. The first bladed wheel 25, the second bladed wheel 26, and the rotating member 24 are accommodated in the housing 11.

A first sealing member 27 is disposed between the shaft insertion hole 16a of the second plate 16 and the rotating member 24. The first sealing member 27 suppresses leak of air from the first bladed wheel chamber 13b toward the motor chamber S1. A second sealing member 28 is disposed between the shaft insertion hole 17a of the third plate 17 and the rotating member 24. The second sealing member 28 suppresses leak of air from the second bladed wheel chamber 14b toward the motor chamber S1. The first sealing member 27 and the second sealing member 28 are each a seal ring, for example.

The electric motor 18 includes a cylindrical rotor 31 and a cylindrical stator 32. The rotor 31 is fixed to the rotary shaft 24a. The stator 32 is fixed in the housing 11. The rotor 31 is disposed radially inside the stator 32 and rotated together with the rotating member 24. The rotor 31 includes a cylindrical rotor core 31a fixed to the rotary shaft 24a and a plurality of permanent magnets, which is not illustrated, disposed in the rotor core 31a. The stator 32 surrounds the rotor 31. The stator 32 includes a stator core 33 and a coil 34. The stator core 33 has a cylindrical shape and is fixed to the inner peripheral surface 121b of the peripheral wall 12b of the motor housing 12. The coil 34 is wound around the stator core 33. The coil 34 receives current from a battery (not illustrated) so that the rotor 31 is rotated together with the rotating member 24. The electric motor 18 rotates at a speed ranging from 100,000 rpm to 1200,000 rpm.

The fuel cell system 1 includes a fuel cell stack 100 as a fuel cell mounted on a vehicle, the turbo compressor 10, a supply passage L1, a discharge passage L2, and a branched passage L3. The fuel cell stack 100 includes a plurality of fuel cells. The fuel cell stack 100 is connected to the discharge chamber 13c through the supply passage L1. The fuel cell stack 100 is also connected to the suction chamber 14c through the discharge passage L2. The branched passage L3 in which an intercooler 110 is disposed branches off from the supply passage L1. The intercooler 110 cools air flowing through the branched passage L3.

When the rotating member 24 is rotated together with the rotor 31, the first bladed wheel 25 and the second bladed wheel 26 are rotated together with the rotating member 24. Air, which has been drawn through the inlet 13a, is compressed by the first bladed wheel 25 in the first bladed wheel chamber 13b, and discharged from the discharge chamber 13c through the first diffuser passage 13d. The air discharged from the discharge chamber 13c is supplied to the fuel cell stack 100 through the supply passage L1. The air supplied to the fuel cell stack 100 is used for electricity generation by the fuel cell stack 100, and the used air is then discharged as exhaust from the fuel cell stack 100 to the discharge passage L2. The exhaust from the fuel cell stack 100 is drawn into the suction chamber 14c through the discharge passage L2. The exhaust drawn into the suction chamber 14c is then discharged to the second bladed wheel chamber 14b through the second diffuser passage 14d. The exhaust discharged into the second bladed wheel chamber 14b rotates the second bladed wheel 26. The rotating member 24 is driven to rotate by the electric motor 18, and also by the rotation of the second bladed wheel 26 by the exhaust from the fuel cell stack 100. The first bladed wheel 25 serving as the operating part of the present disclosure is rotated together with the rotating member 24 to compress and discharge air serving as the fluid of the present disclosure. The exhaust discharged into the second bladed wheel chamber 14b is discharged outside from the outlet 14a.

The turbo compressor 10 includes a plurality of foil bearings 60 that supports the rotating member 24 such that the rotating member 24 is rotatable relative to the housing 11. The plurality of foil bearings 60 includes a pair of thrust foil bearings 30, 30 and a pair of radial foil bearings 40, 40. The pair of thrust foil bearings 30, 30 supports the third supporting portion 24d of the rotating member 24 in the axial direction of the rotating member 24 such that the third supporting portion 24d is rotatable relative to the housing 11. The pair of radial foil bearings 40, 40 supports the first supporting portion 24b and the second supporting portion 24c of the rotating member 24 in a direction perpendicular to the axial direction of the rotating member 24 such that the first supporting portion 24b and the second supporting portion 24c are rotatable relative to the housing 11.

The pair of thrust foil bearings 30, 30 is disposed in the thrust bearing accommodation chamber S2. The thrust foil bearings 30, 30 hold therebetween the third supporting portion 24d as the thrust collar. The thrust foil bearings 30, 30 face the third supporting portion 24d in the axial direction of the rotating member 24. One of the thrust foil bearings 30, 30 is located adjacent to the first end portion 24e of the rotary shaft 24a with respect to the third supporting portion 24d. The other of the thrust foil bearings 30, 30 is located adjacent to the second end portion 24f of the rotary shaft 24a with respect to the third supporting portion 24d.

As illustrated in FIG. 2, one of the opposite end faces of the third supporting portion 24d adjacent to the first end portion 24e of the rotary shaft 24a and axially supported by the one of the thrust foil bearings 30, 30 serves as a bearing-contact surface 24g. The one of the thrust foil bearings 30, 30 has a bearing surface 60a that faces this bearing-contact surface 24g. Similarly, the other of the opposite end faces of the third supporting portion 24d adjacent to the second end portion 24f of the rotary shaft 24a and axially supported by the other of the thrust foil bearings 30, 30 also serves as the bearing-contact surface 24g. The other of the thrust foil bearings 30, 30 also has the bearing surface 60a that faces this bearing-contact surface 24g.

As illustrated in FIGS. 2 and 3, one of the radial foil bearings 40, 40 is disposed in the first bearing holding portion 20, and the other of the radial foil bearings 40, 40 is disposed in the second bearing holding portion 22. In the first bearing holding portion 20, the first supporting portion 24b of the rotating member 24 is rotatably supported by the one of the radial foil bearings 40, 40. The first supporting portion 24b has an outer peripheral surface that also serves as the bearing-contact surface 24g supported by the one of the radial foil bearings 40, 40 in the direction perpendicular to the axial direction of the rotary shaft 24a. The one of the radial foil bearings 40, 40 also has the bearing surface 60a that faces the bearing-contact surface 24g of the first supporting portion 24b. Similarly, in the second bearing holding portion 22, the second supporting portion 24c of the rotating member 24 is rotatably supported by the other of the radial foil bearings 40, 40. The second supporting portion 24c has an outer peripheral surface that serves as the bearing-contact surface 24g supported by the other of the radial foil bearings 40, 40 in the direction perpendicular to the axial direction of the rotary shaft 24a. The other of the radial foil bearings 40, 40 also has the bearing surface 60a that faces the bearing-contact surface 24g of the second supporting portion 24c.

Figure 4:
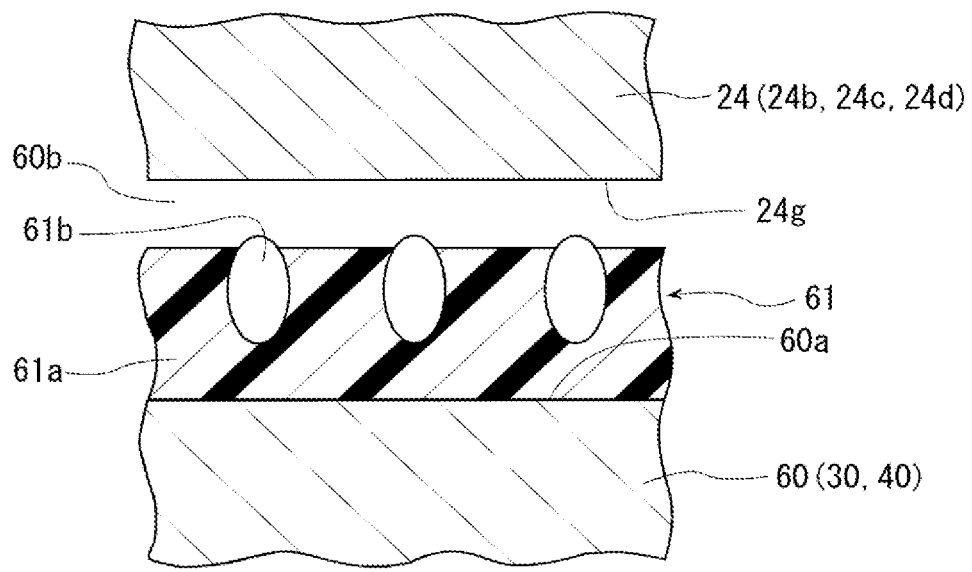
FIG. 4 is a schematically and fragmentary enlarged sectional view of a rotating member and a coating layer of a foil bearing of the turbo compressor according to the embodiment.

As illustrated in FIG. 4, the bearing surface 60a of each foil bearing 60, i.e., the bearing surface 60a of each of the thrust foil bearings 30, 30 and the bearing surface 60a of each of the radial foil bearings 40, 40, each have a coating layer 61. Each coating layer 61 has the same configuration, basically. The coating layer 61 contains polyamide-imide (PAI) that serves as a binder resin 61a, molybdenum disulfide ($MoS_2$) that serves as a solid lubricant 61b, and polytetrafluoroethylene (PTFE) that serves as a solid lubricant. In the coating layer 61, molybdenum disulfide as the solid lubricant 61b and polytetrafluoroethylene are added to polyamide-imide as the binder resin 61a at a predetermined ratio. The coating layer 61 is formed by means, such as coating with spray, a brush, a knife, or an applicator, or screen printing. The coating layer 61 is formed before or after forming of the foil bearing 60. The coating layer 61 is not necessarily grounded.

The basic configurations of the thrust foil bearings 30, 30 and the radial foil bearings 40, 40 are not limited to a particular configuration, and may adopt a basic configuration of an ordinary fluid bearing. When the rotating member 24 rotates at a low speed until the rotational speed of the rotating member 24 reaches a floating rotational speed, the rotating member 24 is supported by each of the thrust foil bearings 30, 30 and the radial foil bearings 40, 40 of the foil bearings 60 with the bearing surface 60a contacting the bearing-contact surface 24g. When the rotating member 24 rotates at a high speed after the rotational speed of the rotating member 24 reaches the floating rotational speed, the rotating member 24 is supported by a fluid film produced in a bearing gap 60b between the bearing surface 60a and the bearing-contact surface 24g without the bearing surface 60a contacting the bearing-contact surface 24g.

As illustrated in FIGS. 1-3, the housing 11 has a cooling passage 50. Air serving as the fluid of the present disclosure flows through the cooling passage 50. The cooling passage 50 is formed through the second plate 16, the first plate 15, the motor housing 12, and the third plate 17. The cooling passage 50 includes a first passage 51 and a second passage 52.

The first passage 51 is formed in the second plate 16. The first passage 51 has an inlet 51a formed in a side wall surface of the second plate 16. The inlet 51a of the first passage 51 is connected to the supply passage L1 through the branched passage L3. The first passage 51 is communicated with the motor chamber S1 through the thrust bearing accommodation chamber S2 and the one of the radial foil bearings 40, 40.

The second passage 52 is formed in the third plate 17. The second passage 52 has an outlet 52a formed in a side surface of the third plate 17. The second passage 52 is communicated with the motor chamber S1 through the other of the radial foil bearings 40, 40.

The air flowed through the supply passage L1 toward the fuel cell stack 100 partly flows into the first passage 51 through the branched passage L3. The air in the first passage 51 has been cooled by the intercooler 110 while flowing through the branched passage L3. The cooled air in the first passage 51 flows into the thrust bearing accommodation chamber S2.

The cooled air in the thrust bearing accommodation chamber S2 flows from the inner peripheral side toward the outer peripheral side mainly through the one of the thrust foil bearings 30, 30. The cooled air flows radially outside of the third supporting portion 24d, and flows from the outer peripheral side toward the inner peripheral side mainly through the other of the thrust foil bearings 30, 30.

The cooled air flows through the thrust bearing accommodation chamber S2 and then flows into the motor chamber S1 through the one of the radial foil bearings 40, 40. The air in the motor chamber S1, for example, flows through a gap between the rotor 31 and the stator 32, and the air then flows into the second passage 52 through the other of the radial foil bearings 40, 40 and is discharged from the outlet 52a.

Accordingly, the cooled air flows through the cooling passage 50 so as to directly cool the electric motor 18, the pair of thrust foil bearings 30, 30, and the pair of radial foil bearings 40, 40.

In this turbo compressor 10, the coating layer 61 is formed on the bearing surface 60a of each foil bearing 60. In the coating layer 61, a predetermined amount of molybdenum disulfide as the solid lubricant 61b is added to polyamide-imide as the binder resin 61a. Accordingly, a predetermined amount of molybdenum disulfide is dispersed in polyamide-imide in the surface of the coating layer 61.

Polyamide-imide as the binder resin 61a has high hardness and high wear resistance. Polyamide-imide further has high toughness and high viscosity. Accordingly, if the predetermined amount of the solid lubricant is not present in the surface of the coating layer 61, a transfer particle (abrasion powders) of polyamide-imide is transferred largely from the surface of the coating layer 61 by initial wear due to sliding of the coating layer 61 on a counterpart. This largely roughens the surface of the coating layer 61, thereby increasing the surface roughness of the coating layer 61 after the initial wear. This raises the upper limit of the thickness of the fluid film in the foil bearing 60. That is, this increases the thickness of the fluid film in the transition from contact support of the rotating member 24 by the foil bearing 60 to non-contact support of the rotating member 24 by the foil bearing 60, i.e., the thickness of the fluid film at the floating rotational speed at which the rotating member 24 floats off the foil bearing 60, thereby decreasing the floating capability of the foil bearing 60. The decrease in the floating capability of the foil bearing 60 increases the possibility of wear of the coating layer 61 due to sliding of the coating layer 61 on the counterpart, thereby decreasing the durability of the coating layer 61.

In this regard, in the coating layer 61 of this turbo compressor 10, a predetermined amount of molybdenum disulfide is dispersed in polyamide-imide. Molybdenum disulfide is a layered solid lubricant that has a crystal structure in which a Mo layer is sandwiched by S layers. The sliding of molybdenum disulfide on the counterpart causes interlayer sliding to easily occur between the S layers, which are weakly bonded to each other, so that molybdenum disulfide exhibits low friction. Further, the sliding of molybdenum disulfide crushes and/or abrades microprojections on the surface of the counterpart or lessens grooves on the surface by initial wear, thereby forming a relatively smooth surface early. Accordingly, the dispersion of molybdenum disulfide in the surface of the coating layer 61 decreases sliding resistance.

Figure 5:
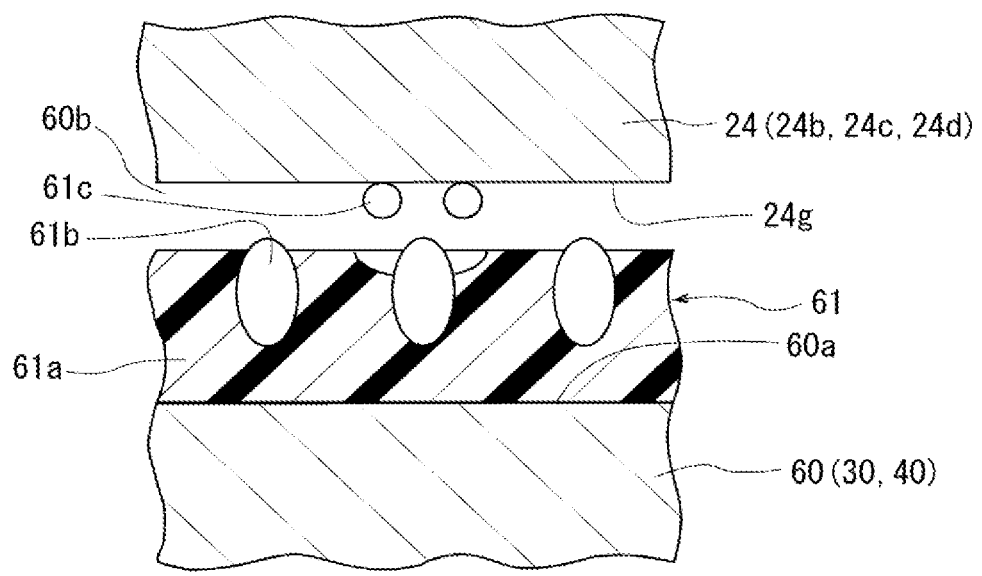
FIG. 5 is a schematic sectional view of the turbo compressor according to the embodiment, explaining the coating layer of the foil bearing wearing off.

Further, molybdenum disulfide has lower toughness and higher hardness than polyamide-imide has. Accordingly, as illustrated in FIG. 5, initial wear transfers a transfer particle 61c of polyamide-imide from the surface of the coating layer 61, and molybdenum disulfide, which is harder than polyamide-imide, cuts the transfer particle 61c. That is, molybdenum disulfide fractionizes the transfer particle 61c of polyamide-imide. This decreases the size of the transfer particle 61c of polyamide-imide in the initial wear. The decrease in size of the transfer particle 61c of polyamide-imide prevents the surface of the coating layer 61 from being roughened largely, thereby suppressing an increase in degree of the surface roughness of the coating layer 61.

The surface smoothness of the coating layer 61 after initial wear is improved in such a manner. This allows a lowering in the upper limit of the thickness of the fluid film in the foil bearing 60, thereby increasing the floating capability of the foil bearing 60. The increase in the floating capability of the foil bearing 60 reduces time of sliding of the coating layer 61 on the counterpart, thereby decreasing the possibility of wear of the coating layer 61 due to the sliding and increasing the durability of the coating layer 61.

Accordingly, the turbo compressor 10 is capable of increasing the durability of the coating layer 61 on the bearing surface 60a of the foil bearing 60 so as to increase the life of the foil bearing 60.

Further, the coating layer 61 of this turbo compressor 10 further contains polytetrafluoroethylene that serves as a solid lubricant. When polytetrafluoroethylene is present in the surface of the coating layer 61, a transfer particle of polytetrafluoroethylene by initial wear due to the sliding on the counterpart adheres to the counterpart so as to form a coating on the counterpart. Polytetrafluoroethylene coating allows easy sliding and enables low friction, thereby decreasing aggressiveness of the counterpart to the coating layer 61. This suppresses transfer of the transfer particle of polyamide-imide and molybdenum disulfide from the coating layer 61. This therefore reduces the depth of wear in the surface of the coating layer 61.

A turbo fluid machine, such as the turbo compressor 10, for compressing and discharging air to the fuel cell stack 100 as fuel cells mounted on a vehicle, is required to have motor rotation at a speed of 100,000 rpm or more so as to have small size and the capability to transport gas at a large flow rate. Further, such a turbo fluid machine is, preferably, an electric turbo fluid machine, which is capable of varying rpm in response to variation in power generation necessary for the fuel cell stack 100. If the electric motor 18 is stopped while the electric motor 18 is rotating at a speed of 100,000 rpm or more, inertia of suction gas acts on the rotating member 24 and may bring the bearing-contact surface 24g of the rotating member 24 into contact with the bearing surface 60a of the foil bearing 60 with heavy load. The heavy contact load causes the transfer particle (abrasion powders) of polyamide-imide to be transferred largely from the surface of the coating layer 61, thereby roughening the surface of the coating layer 61 largely. Accordingly, the coating layer 61 may have an increased surface roughness after wear.

In this regard, the coating layer 61 of this turbo compressor 10 is capable of decreasing its surface roughness.

<Fiction and Wear Test>

Test samples No. 1-5 shown in Table 1 were prepared for testing. The substrate of each of test samples No. 1-5 was made of stainless steel, and a coating layer was formed on a surface of each substrate. Molybdenum disulfide as a solid lubricant was added at a ratio shown in Table 1 to polyamide-imide as a binder resin to form the coating layer. As shown in Table 1, a mass ratio of molybdenum disulfide to polyamide-imide in test sample No. 2 was 0.42, and a mass ratio of molybdenum disulfide to polyamide-imide in test sample No. 5 was 1.27. Such mass ratios of the other test samples are also shown in Table 1.

TABLE 1

|  | $MoS_2$ (mass ratio to PAI) |
|---|---|
| Test sample No. 1 | 0 |
| Test sample No. 2 | 0.42 |
| Test sample No. 3 | 0.55 |
| Test sample No. 4 | 1.14 |
| Test sample No. 5 | 1.27 |

Test samples No. 1-5 use harder and tougher polyamide-imide as the resin binder 61a. The coating layer 61 of each of test samples No. 1, 2, 4, and 5 has Vickers hardness of 20 MHV or more. In each of test samples No. 1-5, the average particle diameter of molybdenum disulfide is 1.6 μm.

Figure 6:
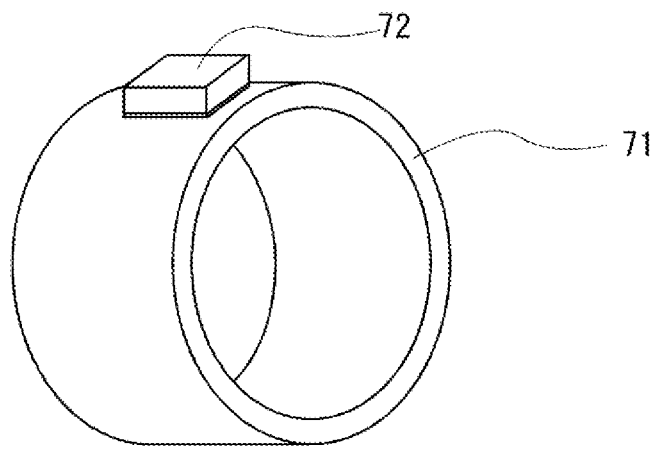
FIG. 6 is a perspective view of a ring with a block in a friction and wear testing.

Test samples No. 1-5 were tested in Block-on-Ring wear test under test conditions below. In the test, a block 72 served as each of test samples No. 1-5. As illustrated in FIG. 6, a ring 71, which served as a counterpart of the block 72, was rotated on the block 72 such that the coating layer of the block 72 slid on the outer peripheral surface of the ring 71 with a predetermined load.

Figure 7:
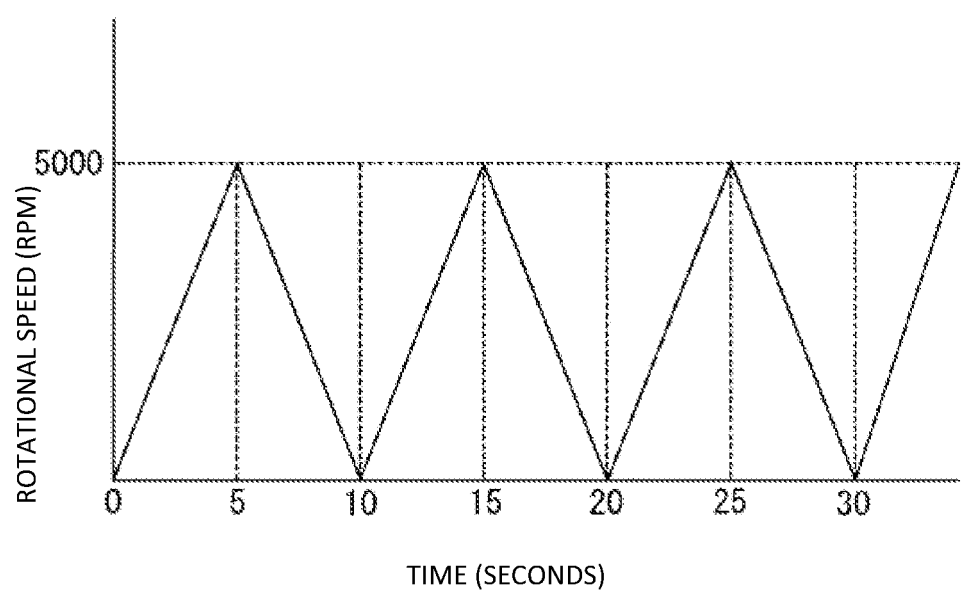
FIG. 7 is a diagram for explaining friction and wear testing conditions.

As shown in FIG. 7, the test was conducted in 20-minute cycles such that the rpm of the ring 71 increased from 0 rpm to 5,000 rpm over five seconds and then decreased from 5,000 rpm to 0 rpm over another five seconds.

Testing Machine:
  UMT-3 (Bruker Corporation)
Test Mode:
  Block-on-Ring wear test (Go-Stop)
Test Sample:
  Block: 6.2×10.2×16.5 mm
  Material: coating on substrate (SUS304), formed by splay coating, baking, and grinding.
Counterpart:
  Ring: ϕ35×8.77 mm
Material: Ti64
Load:
  approx. 0.5 N (50 gf)
Contact Pressure:
  0.04 MPa (wear width: 2 mm)
Rotational Speed:
  5,000 rpm
Maximum Sliding Speed:
  9.16 m/s (the sliding speed when the rotating member is floating off the foil bearing)
Time for Increasing/Decreasing Rpm:
  5 seconds/5 seconds
Environment:
  Dry-lubrication
Testing Start Temperature:
  Ambient temperature (not controlled)
Testing Time:
  20 minutes
Remark:
  Forced air blowing (to prevent temperature increase due to sliding)

<Relationship Between Molybdenum Disulfide Content and Surface Roughness>

The surface roughness of the coating layer of each of test samples No. 1-5 was measured after testing. Specifically, the surface roughness of each coating layer was measured along the rotational direction of the ring 71 by a contact roughness meter under conditions conforming to JIS B 0633:2001. The result is shown in FIG. 8.

Figure 8:
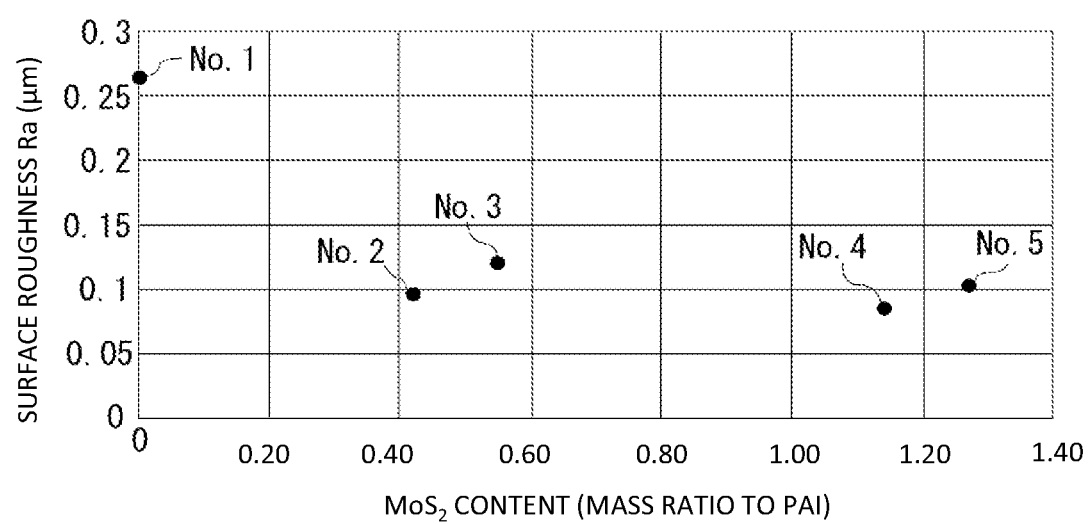
FIG. 8 is a graph showing a relationship between surface roughness of the coating layer and a molybdenum disulfide content after the friction and wear testing.

As shown in FIG. 8, the coating layer of test sample No. 1 without containing molybdenum disulfide had a largely roughened surface after initial wear. In contrast, the coating layers of test samples No. 2-5 containing molybdenum disulfide in a mass ratio of 0.42 or more to the polyamide-imide content had a relatively smooth surface after initial wear. Accordingly, the test demonstrated that the molybdenum disulfide content of 0.42 or more in mass ratio to the polyamide-imide content produces the advantageous effects of the present disclosure. Further, the testing with test sample No. 5 demonstrated that the molybdenum disulfide content of 1.27 or less in mass ratio to the polyamide-imide content produces the advantageous effects of the present disclosure.

Although the present disclosure has been described based on the above embodiment, the present disclosure is not limited to the above embodiment, and may be modified within the scope of the present disclosure.

For example, according to the embodiment, although the coating layer 61 is formed on the bearing surface 60a of each foil bearing 60, the present invention is not limited thereto. The coating layer 61 may be formed on the bearing-contact surface 24g of the counterpart, or formed on both of the bearing surface 60a of the foil bearing 60 and the bearing-contact surface 24g of the counterpart.

According to the embodiment, although the coating layer 61 contains molybdenum disulfide and polytetrafluoroethylene, which each serve a solid lubricant, the present invention is not limited thereto. The coating layer 61 may contain molybdenum disulfide only without containing polytetrafluoroethylene as a solid lubricant, or may contain other solid lubricant, an additive, and/or a filler as necessary.

The present disclosure is applicable to a fluid machine for a fuel cell system, such as an air compressor.

What is claimed is:

1. A turbo fluid machine comprising:
   a rotating member having a bearing-contact surface;
   an operating part configured to rotate together with the rotating member to compress and discharge a fluid;
   a housing accommodating the rotating member and the operating part; and
   a foil bearing having a bearing surface that faces the bearing-contact surface and supporting the rotating member such that the rotating member is rotatable relative to the housing, wherein
   at least one of the bearing-contact surface or the bearing surface has thereon a coating layer,
   the coating layer comprises polyamide-imide serving as a binder resin and molybdenum disulfide serving as a solid lubricant,
   a mass ratio of molybdenum disulfide to polyamide-imide is 0.42 or more, and
   a surface roughness of the coating layer is between 0 μm and 0.15 μm.

2. The turbo fluid machine according to claim 1, wherein the mass ratio of molybdenum disulfide to polyamide-imide is 1.27 or less.

3. The turbo fluid machine according to claim 1, wherein the coating layer further comprises polytetrafluoroethylene serving as another solid lubricant.

4. The turbo fluid machine according to claim 1, wherein
   the turbo fluid machine is configured to compress and discharge air to a fuel cell mounted on a vehicle, and
   the turbo fluid machine comprises an electric motor that is configured to drive the rotating member while rotating at a speed of 100,000 rpm or more.

* * * * *